United States Patent [19]
Keller et al.

[11] Patent Number: 5,797,332
[45] Date of Patent: Aug. 25, 1998

[54] CLOSED LOOP GASIFICATION DRYING SYSTEM

[75] Inventors: Michael R. Keller, Tulsa; John R. Petersen, Pawnee; David Caffey, Tulsa, all of Okla.

[73] Assignee: Callidus Technologies, Inc., Tulsa, Okla.

[21] Appl. No.: 514,117

[22] Filed: Aug. 11, 1995

[51] Int. Cl.$^6$ ............................................. F23D 14/00
[52] U.S. Cl. ..................... 110/226; 110/246; 110/216; 110/254
[58] Field of Search ............... 110/229, 224, 110/226, 246, 254, 236, 211, 212, 204, 216

[56] References Cited

U.S. PATENT DOCUMENTS

| | | | |
|---|---|---|---|
| 2,556,090 | 6/1951 | Jenkins | 48/76 |
| 3,460,979 | 8/1969 | Giese et al. | 117/116 |
| 3,963,426 | 6/1976 | Hand | 48/197 |
| 4,052,173 | 10/1977 | Schulz | 48/202 |
| 4,177,740 | 12/1979 | Lamb et al. | 110/213 |
| 4,300,460 | 11/1981 | Lamb et al. | 110/346 |
| 4,388,082 | 6/1983 | Guttmann et al. | 48/76 |
| 4,459,136 | 7/1984 | Linneborn et al. | 48/111 |
| 4,472,245 | 9/1984 | Halm | 201/19 |
| 4,479,481 | 10/1984 | Ingersoll et al. | 126/76 |
| 4,498,909 | 2/1985 | Milner et al. | 48/209 |
| 4,530,700 | 7/1985 | Sawyer et al. | 44/1 |
| 4,541,841 | 9/1985 | Reinhardt | 48/197 |
| 4,544,375 | 10/1985 | Rehmat et al. | 48/197 |
| 4,564,368 | 1/1986 | Sawyer et al. | 44/1 |
| 4,601,730 | 7/1986 | McGowan et al. | 48/76 |
| 4,624,684 | 11/1986 | Stevenson | 48/197 |
| 4,670,156 | 6/1987 | Grenthe | 210/691 |
| 4,672,899 | 6/1987 | Kainer | 110/234 |
| 4,706,579 | 11/1987 | Merrell | 110/343 |
| 4,738,207 | 4/1988 | Moss | 110/347 |
| 4,759,777 | 7/1988 | Balakrishnan | 55/85 |
| 4,890,563 | 1/1990 | White et al. | 110/246 |
| 5,034,498 | 7/1991 | Himmelblau | 528/230 |
| 5,057,009 | 10/1991 | Nechvatal et al. | 110/246 X |
| 5,059,404 | 10/1991 | Mansour et al. | 423/201 |
| 5,103,743 | 4/1992 | Berg | 110/226 |
| 5,273,355 | 12/1993 | May et al. | 110/246 X |
| 5,471,937 | 12/1995 | Kosky et al. | 110/229 X |

*Primary Examiner*—Henry A. Bennett
*Assistant Examiner*—Susanne C. Tinker
*Attorney, Agent, or Firm*—Arnold, White & Durkee

[57] ABSTRACT

A system for reducing volatile organic compounds, particulates and carbon monoxide in exhaust from a wood products dryer is disclosed. The dryer exhaust is combined with waste wood or biomass fuel and partially combusted in a rotary gasifier, then fully combusted in a secondary combustion chamber. Hot flue gasses form the secondary combustion chamber are used to heat the conduits carrying the exhaust from the dryer, to heat oil, and to preheat air input to the dryer.

17 Claims, 1 Drawing Sheet

CLOSED LOOP GASIFICATION DRYING SYSTEM

BACKGROUND OF THE INVENTION

1. Field of the Invention

This invention relates generally to the combustion of volatile organic compounds, carbon monoxide and particulate matter in exhaust vapors from wood products plants. More particularly, the present invention relates to a closed loop gasification drying system for reducing emissions from the drying of wood products.

2. Description of the Related Art

In conventional wood products plants, green wood has been sized, chipped, and then passed through direct fired rotary dryers to remove excess moisture. A direct fired rotary dryer typically operates as a concurrent heat exchanger with hot (440 to 1600 degrees F.) flue gas and cold, wet wood chips entering the dryers at the same location. Direct fired rotary dryers are commonly found in oriented strand board ("OSB") plants. The drying process generates emissions of volatile organic compounds, organic and inorganic particulates, carbon monoxide and ash. Control of these emissions has become increasingly important due to regulatory guidelines.

One approach that has been used to control emissions from wood products plants is to run them through an oxidizer at much higher temperatures, such as 1500 to 2000 degrees F. However, problems arise due to localized hot spots and pluggage due to melting of salts, and these units have a disadvantage because they require burning of natural gas or other fossil fuel.

In recent years, the wood products industry has moved away from plywood and developed alternatives such as OSB. There also has been a lower demand for pulp wood, promising the development of more products made from smaller trees. As a result of the manufacturing process, bark and waste wood is an inexpensive and readily available fuel source. Waste wood may be hogged wood, bark, sawdust, planer shavings, sander dust, and other wood fuels of small size (typically 2" or less).

SUMMARY OF INVENTION

The present invention provides a closed loop gasification drying system to reduce emissions of volatile organic compounds, carbon monoxide and particulate emissions typically encountered at wood products plants. The invention provides a cost effective, highly efficient emissions control system and process to provide a high degree of destruction of volatile organic compounds, particulates, and carbon monoxide, to meet regulatory guidelines.

DETAILED DESCRIPTION OF A PREFERRED EMBODIMENT

Figure 1:
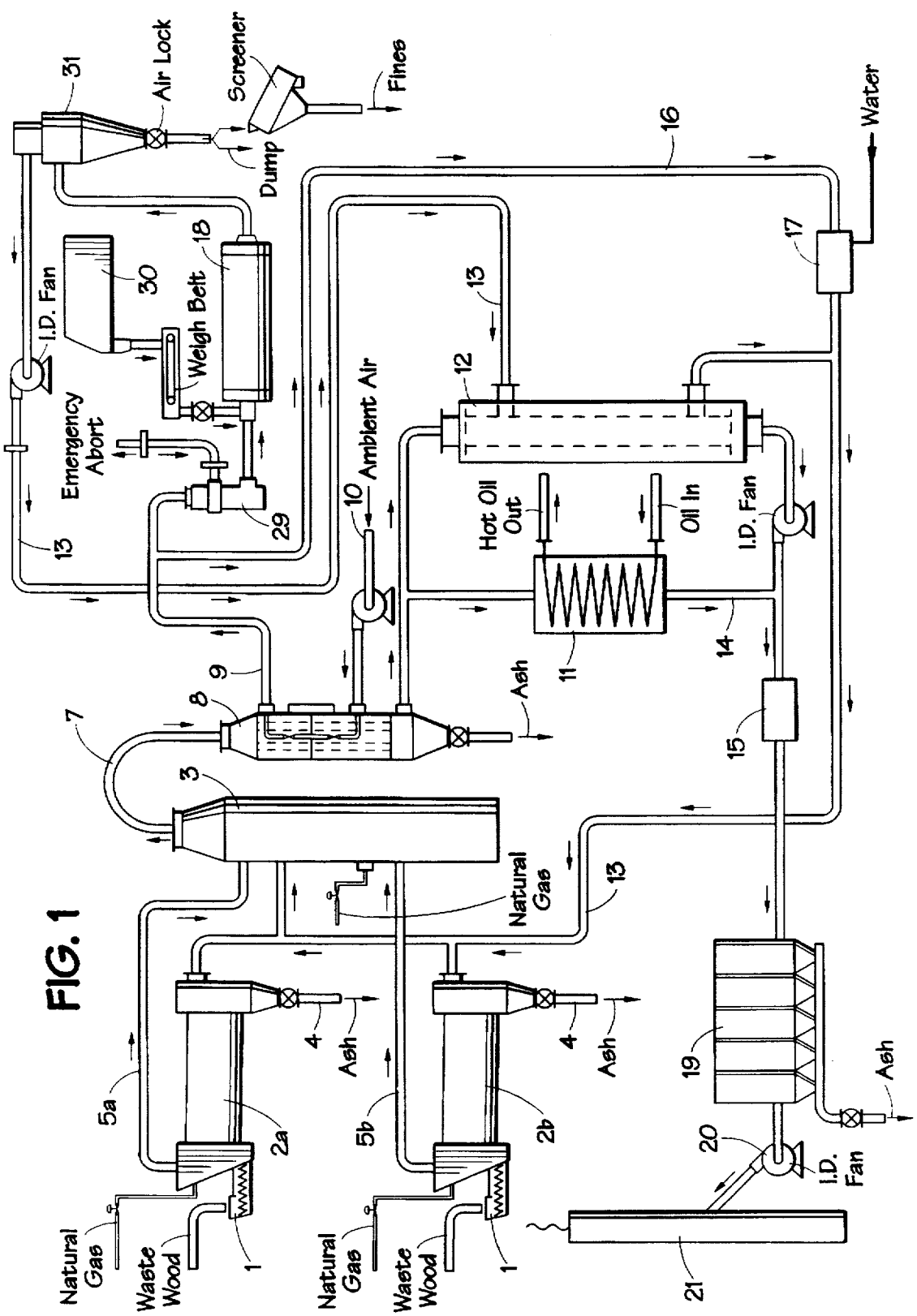
FIG. 1 is a schematic drawing of the closed loop gasification drying system according to a preferred embodiment of the present invention.

As shown in FIG. 1, green bin 30, direct fired rotary dryer 18 and product collector 31 are components of a typical drying system at a wood products plant. Green wood from green bin 30 is conveyed to direct fired rotary dryer 18 to remove excess moisture from the wood chips. The dryed wood is then conveyed to product collector 31 where dried chips are separated from the air. The drying system generates a gaseous stream of volatile organic compounds, particulates and carbon monoxide.

The present invention involves modification of the drying system to provide a closed loop system, which results in a high degree of destruction of volatile organic compounds, particulates and carbon monoxide generated by the dryer, and recovers heat from the gas stream. By closed loop system, it is meant that a bypass loop allows eliminating the need to rapidly adjust the firing ratio of the energy system.

According to the present invention, exhaust gases from direct fired rotary dryer 18, laden with volatile organic compounds, carbon monoxide, and some entrained particulate matter, are routed through conduit 13 to rotary gasifiers 2a, 2b and secondary combustion chamber 3. In a preferred embodiment, approximately 20% of the gaseous stream from the dryer is fed to each of the two rotary gasifiers. The remaining 60% of the gaseous stream from the dryer is incinerated between 1400 and 2000 degrees F. in secondary combustion chamber 3.

In each rotary gasifier, the gaseous stream exhausted from the dryer blends with waste wood, or biomass fuel. Feed screw 1 delivers waste wood at a metered rate to each rotary gasifier 2a, 2b. In a preferred embodiment, the feed screw is cantilevered, and designed to form a sealing plug of biomass, preventing air entry into the gasifier. Any combination of biomass fuels, hogged wood, bark, screen fines, saw dust, planer shavings, sander dust, and other wood fuels (2 inches dimension or less) can be utilized as the fuel source. The rotary gasifier uses natural gas for start-up only.

In a preferred embodiment, the feed screws are designed to accept wood from a metering and conveying system which drops the wood into a feed hopper. Material discharged from the fuel metering system hoppers enter the feed screws. To maintain an air lock into the gasifiers, a portion of the material is maintained in front of the feed screw. Preferably, the feed screw has a diameter of at least 12 inches and a length of ten feet, discharging into an enclosed tube which directs the biomass material into each rotary gasifier. Preferably, the feed screws are driven by a variable speed motor connected to a reduction gearbox. The screw speed should be variable from 0.1 to 1.5 RPM. To provide operator control and interface, the biomass fuel metering system is adjustable by the operator. This capability allows the fuel feed rate to be fine tuned and varied during those periods when the fuel composition changes and when adjustments are being made to the dryer operation.

Preferably, each rotary gasifier 2a, 2b is operated in a starved air mode, in which the oxygen level is too low for complete combustion to occur. Most preferably, the gasifier should run at approximately 50% of the air supply needed for complete combustion. In this mode of operation, only enough air is admitted to the gasifier to allow the combustion to proceed at a controlled rate. As a result, combustible gases are formed from the biomass fuel. Flue gases leaving the gasifier contain combustible gases (primarily carbon monoxide and hydrogen). Preferably, each gasifier is sized for a residence time of wood fuels of approximately 60 to 90 minutes, and is operated at approximately 1000 to 2000 degrees F. in the starved air mode. Each gasifier is sealed to prevent any air leakage from or into the gasifier. Ash from the gasifier is removed and moistened through continuous dry ash removal system 4. The ash is transferred into roll-off containers.

Flue gases leaving the rotary gasifiers through conduits 5a, 5b are further heated in secondary combustion chamber 3 to between 1400 and 2000 degrees F., to assure complete destruction of any unburned organic vapors and fine wood particles, and to fully oxidize the carbon monoxide to carbon dioxide. Secondary combustion chamber 3 preferably is a gas phase incinerator in a vertical vessel to prevent any entrained particulates from collecting in the vessel and causing unscheduled system shutdowns due to plugged duct work. The unburned dryer exhaust gas is used as an oxygen source to complete the combustion process in the secondary combustion chamber. The secondary combustion chamber uses natural gas for start-up.

Hot flue gas exits secondary combustion chamber 3 through conduit 7 to fresh air heat exchanger 8. The heat exchanger contacts only clean air with hydrocarbon free flue gas to avoid coke formation and exchanger fouling. Ambient air, which is used as the primary air source to the rotary wood dryer, is preferably forced through the fresh air heat exchanger by forced air fan 10. Heat exchanger 8 is used to preheat the ambient air supply to rotary wood dryer 18. Within the heat exchanger, the air temperature is raised from ambient conditions to approximately 1200° F. After the air is heated in the heat exchanger, it passes through conduit 9, and is then mixed in blend chamber 29 with an amount of outlet flow from the dryer (recycle) to produce a mixed gas stream into the dryer for low dryer inlet temperature requirements. Control of this mixed stream temperature is done by adjusting the recycle flow from the dryer outlet.

The closed loop feature allows any hot air not needed by the dryer to be bypassed through conduit 16 and quenched by water in quench chamber 17. The condition of the air exiting to the quench chamber is the same as if it had travelled through dryer 18.

Temperature control of gases leaving the secondary combustion chamber is accomplished by limiting performance of the rotary gasifier. If the secondary combustion chamber temperature is above 1500° F., the gasifier air supply is reduced, therefore reducing the volume of gases leaving the gasifiers. If the temperature is below 1500° F. in the secondary combustion chamber, indicating the need for a higher combustion rate, the air supply is increased until the desired set point is reached.

A portion of the flue gas from the fresh air heat exchanger is then routed through thermal oil heater 11. The thermal oil heater heats oil from 350 to 550 degrees F. for use on the presses and wax tank in a typical wood products plant. In a preferred embodiment, the thermal oil heater is designed to heat 1000 gallons of oil per minute. The temperature of the heated oil may be controlled by either using a water quench on the upstream flue gas side of the exchanger or cooling the oil on the inlet of the exchanger to control the outlet oil temperature. The thermal oil heater preferably is a one pass shell and tube type exchanger.

The remaining portion of flue gas which does not go to thermal oil heater 11 is routed to duct heater 12. The duct heater is essentially a double wall pipe heat exchanger system. The duct heater serves two purposes. First, it keeps the pipe walls above the dew point of the hydrocarbons in the dryer exhaust gases. This reduces condensation on the pipe walls, and reduces hydrocarbons attaching to the walls which 8 causes fire hazards and/or necessitates washing of the pipe walls. Second, the duct heater preheats the dryer gases from approximately 240 to 400 degrees F. which is desirable for input to the rotary gasifiers. Cooled flue gases from thermal oil heater 11 and duct heater 12 are then quenched with a water spray in quench chamber 15, if required, to further reduce the operating temperature to approximately 450 degrees F. if necessary before passing through dry particulate collector (or baghouse) 19, or other dust collection system, to remove entrained particulate matter. Dry particulate collectors are commonly and widely applied particulate emission control devices. The operating principle is to pass dust laden flue gases through a filtration medium. The cleaned gas passes through the medium and the particulate is retained on the medium face as a filter cake. The filter cake and particulate is subsequently removed for collection and removal in ash hoppers. The dry particulate collector is typically insulated to prevent exterior walls from corroding due to condensed flue gases. In a preferred embodiment, the baghouse is a modular unit designed for worst case system operation in that the baghouse can be kept on stream while in the cleaning mode.

The flue gases then flow to induced draft fan 20. Induction of flue gas through the entire incineration system will be supplied by the induced draft fan. The induced draft fan maintains a slightly negative pressure in the rotary gasifier and generates the necessary induction to overcome the various pressure drops in the system. In the refired embodiment, the fan inlet pressure is controlled by a pressure controller located on the rotary gasifier which varies the induced draft fan speed. This allows operation of a large fan at low horsepower levels during most of the operating cycle and still have large reserve capacity to handle occasional upsets.

Flue gases from the induced draft fan are ducted to exhaust vent stack 21 and exhausted to atmosphere. The height of discharge is established to provide a discharge elevation at least 20 feet higher than any nearby building or structure.

Control of the combustion process is increasingly important as the concentration of the waste stream changes and the heating value of the waste wood fuel varies. Failure to control the unit within limits can result in temperature excursions and severe damage to the equipment. Therefore, it is very advantageous to provide continuous feeding of the waste wood fuel to the gasifier. However, even continuous feeding often results in fairly significant spikes of flow of waste wood into the gasifier. These variations in feed rate of material into the gasifier can result in very dramatic swings in flue gas production and heat release within the gasifier. This variation in flue gas flow and heat release is most dramatic with ram loading of high-BTU waste wood. In actual field measurements of flue gas production versus time following batch loading of waste wood, it is common to find a 25 percent increase over the design heat material balance rates for the waste material in a reducing gasifier atmosphere. What this means, in simple terms, is that the downstream equipment, induced draft fan, scrubber, etc. must be sized approximately 25 percent greater than the calculated heat and material balances in order to ensure proper operating pressures in the primary gasifier and secondary combustion chamber at all times. The heat exchanger and air pollution control device also must be oversized to ensure that it will function as designed even during increased heat and/or material loads. A significant reduction in these peaks can be achieved by screw feeding, but the peaks cannot be totally eliminated. Actual operating experience indicates that a safety factor of approximately 20 percent above the design heat and material balance should be included in the scrubber and downstream ancillary equipment, specifically the induced draft fan.

A temperature and flow control system helps control the outlet temperature of the primary heat exchanger while the load on the press and the system of this invention varies. An air cooler is used to reject the excess heat absorbed in the hot oil heat exchanger. The air cooler will dramatically reduce the amount of quench water required and will prevent the exchanger tubes from scaling due to the extended periods of quenching.

Important considerations when operating in a reducing mode are the proper design of the feed area, the ash area nose piece of the gasifier and the seals. It is important that the feed area eliminate any exposed metals, chutes, or other parts inside the kiln. This is particularly important when there are sulfur compounds present in the material to be combusted. Sulfur at high temperature in a reducing material used in this service can lead to rapid failures. The present invention eliminates this problem by utilizing refractory tiled sections for all feed points. There are no exposed metal surfaces in the feed area or any other part of the rotary gasifier system.

The ash area is equally important. First, it is desirable to avoid the use of the normal 50—50 chrome-nickel case retainers due to sulfidation effects of the reducing rotary gasifier. Secondly, to provide adequate cooling to the nose piece and seals at the ash end of the gasifier, the present invention uses a roll back section to the gasifier which allows the use of precast refractory tiles to completely cover the nose piece of the gasifier. This eliminates any metal exposure at the end of the gasifier and provides for a stable, cool, durable nose piece to the gasifier.

To prevent any air leakage from or into the gasifier, the seals are of importance in the design of the present invention. No seal design will effectively operate unless the gasifier has been built to appropriate tolerance. To achieve this end, in a preferred embodiment, the present invention uses a machined tire section on the gasifier and machined free-floating forged tires. Seals are provided at both ends of each gasifier between the rotating shell and stationary front plate and discharge hood. The seal is maintained by applying a uniform force between a graphite based seal block system (carbon wear shoes) and a rotating sealing surface attached to the gasifier shell. The seal force is applied by a system of weights which maintains a uniform force for the seal blocks against the seal surface while allowing for axial and radial movement caused by thermal expansion of the gasifier. At the discharge end, the gasifier shell is rolled back on itself forming an annular space between the seal surface mounting point and the high temperature surface of the gasifier. This annular space provides for natural convective cooling of the seal surface to allow it to operate at a lower temperature than the shell.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An emissions reduction system for a wood or biomass dryer generating dryer exhaust having emissions therein, comprising:

(a) a rotary gasifier connected to the dryer exhaust and to a waste wood supply, the rotary gasifier adapted to blend and partially combust the waste wood and dryer exhaust; and (b) a secondary combustion chamber adapted to receive and combust output from the rotary gasifier and provide a flue gas output having reduced content of volatile organic compounds, particulate and carbon monoxide below that of the dryer exhaust, wherein the temperature of the secondary combustion chamber controls the combustion rate of the rotary gasifier;

(c) a heat exchanger connected to an air source and receiving the flue gas output from the secondary combustion chamber, the heat exchanger heating the air source and forcing a first portion of the heated air to the wood or biomass dryer; and (d) secondary means for cooling a second portion of the heated air.

2. The system of claim 1 wherein some of the dryer exhaust flows directly from the dryer to the secondary combustion chamber.

3. The system of claim 1 further comprising a screw conveyor for delivering waste wood to the rotary gasifer.

4. The system of claim 1 further comprising a fresh air heat exchanger connected to an air source and to the flue gas output from the secondary combustion chamber, the flue gas heating the air to above ambient and forcing the heated air through a conduit to the dryer.

5. The system of claim 1 further comprising a thermal oil heater connected to an oil source and to the flue gas output from the secondary combustion chamber, the flue gas heating the oil.

6. The system of claim 1 further comprising a duct heater connected to the flue gas output form the secondary combustion chamber and to the dryer exhaust, the flue gas output from the secondary combustion heating the dryer exhaust.

7. The system of claim 1 wherein the rotary gasifier is configured to operate at an oxygen level below that needed for complete combustion.

8. The system of claim 1 comprising two rotary gasifiers.

9. The system of claim 1 further comprising a quench chamber for cooling the flue gas output from the secondary combustion chamber.

10. The system of claim 1 further comprising a dry particulate collector for filtering out particles in the flue gas output from the secondary combustion chamber.

11. A wood products drying system comprising:

(a) a dryer for drying wood having excess moisture therein, the dryer receiving an air supply and generating exhaust gases;

(b) a product collector for separating out dried wood chips from the dryer;

(c) at least one rotary gasifier receiving waste wood and a first fraction of the exhaust gases from the dryer, the gasifier partially combusting the exhaust gases and waste wood and having an adjustable air supply for controllably limiting combustion whereby combustible gases are exhausted therefrom;

(d) a secondary combustion chamber receiving a second fraction of the exhaust gases from the dryer and receiving the combustible gases exhausted from the gasifier, the secondary combustion chamber incinerating said gases and discharging hot flue gas;

(e) a heat exchanger receiving the hot flue gas from the secondary combustion chamber, and heating an air supply provided to the dryer;

(f) a quench chamber for receiving and cooling any air supply in excess of that provided to the dryer; and (g) secondary means for cooling the hot flue gas passing through the heat exchanger.

12. The wood products drying system of claim 11 wherein the secondary means is a thermal oil heater.

13. The wood products drying system of claim 11 wherein the secondary means is heater for heating the space between the walls of double walled pipe.

14. The wood products drying system of claim 11 wherein the secondary means is a second quench chamber.

15. The wood products drying system of claim 11 wherein the rotary gasifier operates at an internal pressure below atmospheric pressure.

16. The wood products drying system of claim 11 wherein the rotary gasifier air supply is variable based on the secondary combustion chamber temperature.

17. The closed loop system of claim 11 further comprising a blend chamber for mixing the air supply with recycle flow from the dryer to produce a mixed gas stream into the dryer.

* * * * *